United States Patent [19]

Takegawa et al.

[11] Patent Number: 4,479,840

[45] Date of Patent: * Oct. 30, 1984

[54] TWO-PART ADHESIVE AND BONDING METHOD EMPLOYING SAME

[75] Inventors: Shuji Takegawa, Suita; Tadao Kunishige, Takatsuki, both of Japan

[73] Assignee: Sunstar Giken Kabushiki, Osaka, Japan

[*] Notice: The portion of the term of this patent subsequent to Jun. 7, 2000 has been disclaimed.

[21] Appl. No.: 470,930

[22] Filed: Mar. 1, 1983

Related U.S. Application Data

[63] Continuation-in-part of Ser. No. 179,461, Aug. 19, 1980, Pat. No. 4,386,992, which is a continuation-in-part of Ser. No. 122,702, Feb. 19, 1980, abandoned.

[30] Foreign Application Priority Data

May 11, 1979 [JP] Japan ................................. 54-58339

[51] Int. Cl.$^3$ ............................ C09J 5/00; C08J 3/00
[52] U.S. Cl. ................................... 156/327; 427/426; 524/1; 524/543; 562/553
[58] Field of Search .................. 156/327; 524/1, 543; 562/553; 252/431 N; 427/426

[56] References Cited

U.S. PATENT DOCUMENTS

| | | | |
|---|---|---|---|
| 2,204,384 | 6/1940 | Salisbury | 106/162 |
| 2,318,559 | 5/1943 | Percival | 134/3 |
| 3,085,076 | 4/1963 | Zimmerman | 156/327 |
| 3,165,434 | 1/1965 | Keskkula et al. | 156/327 |
| 3,301,809 | 1/1967 | Goldberg et al. | 156/327 |
| 3,563,851 | 2/1971 | Armour et al. | 156/327 |
| 3,667,998 | 6/1972 | Esser | 427/426 |
| 4,386,992 | 6/1983 | Takegawa et al. | 156/327 |

FOREIGN PATENT DOCUMENTS

154429 12/1979 Japan .................................. 156/326

*Primary Examiner*—John J. Gallagher
*Attorney, Agent, or Firm*—Stevens, Davis, Miller & Mosher

[57] ABSTRACT

A two-part adhesive comprising an aqueous synthetic resin emulsion adhesive and a gelling agent comprising a combination of (a) a member selected from the group consisting of calcium pantothenate, glycine calcium salt, alanine calcium salt, serine calcium salt, threonine calcium salt, methionine calcium salt, phenylalanine calcium salt and calcium aspartate and (b) a member selected from the group consisting of an organic acid salt and an inorganic acid salt, which can bond without any temporary tacking or fixing means, and a method for bonding two substances together with said two-part adhesive.

9 Claims, No Drawings

TWO-PART ADHESIVE AND BONDING METHOD EMPLOYING SAME

This application is a continuation-in-part application of U.S. Ser. No. 179,461 filed on Aug. 19, 1980, now U.S. Pat. No. 4,386,992, which is, in turn, a continuation-in-part application of U.S. Ser. No. 122,702 filed on Feb. 19, 1980, now abandoned.

The present invention relates to a two-part adhesive and a method for bonding with an aqueous emulsion adhesive. More particularly, it relates to a two-part adhesive comprising an aqueous emulsion adhesive and a gelling agent which can bond instantaneously, and a method for bonding with the two-part adhesive.

There have hitherto been known various adhesives which contain an organic solvent as a medium, but such organic solvent type adhesives have unfavorably some problems such as flammability, toxicity, and environmental pollution. Accordingly, there have recently been used aqueous emulsion adhesives, when either one or both of substances to be adhered are a substance which can permeate and absorb water or steam.

The aqueous emulsion adhesives usually comprise an emulsion of a polymer in water and optionally a tackifier, a filler, a plasticizer, a colorant, an aging inhibitor, or the like. The aqueous emulsion adhesives have no flammability and a low toxicity and hence are safe and hygienic, and further they can be filled well because of the low viscosity (while they have a high nonvolatile content) and can be diluted with water. However, the aqueous emulsion adhesives have unfavorably a low initial bond strength in comparison with organic solvent type adhesives, and hence, much time is required until the sufficient bond strength is achieved. For instance, when a thermal insulator such as a polyurethane foam is bonded onto a steel board of the car ceiling, they can be bonded with organic solvent type adhesives only by applying the adhesives to surface of the steel board and/or thermal insulator and assembling them under pressure, i.e. only by a contact pressing, but in case of using aqueous emulsion adhesives, the thermal insulator is peeled off and falls with its weight unless the thermal insulator is temporarily tacked or fixed with any other means until the adhesive cures, i.e. an extra step of the temporary tacking or fixing is required after the contact pressing.

In order to eliminate of the drawback of the aqueous emulsion adhesives, it has been studied to improve the initial bond strength of aqueous emulsion adhesives and thereby to achieve rapidly the desired bonding. For instance, it is necessary to increase the viscosity of the adhesive by increasing the amount of the solid components thereof, or to heat the substances to be bonded before or after the application of the adhesive in order to distill water contained in the substances. According to these methods, however, the storage stability and/or application performances of the adhesives are deteriorated, or another apparatus is required. Thus, there has never been found any satisfactorily improved method.

Under the circumstances, the present inventors have intensively studied on an improvement of aqueous emulsion adhesives. As a result, it has been found that when the aqueous emulsion adhesive is used in a combination of a gelling agent, the aqueous emulsion adhesive can instantaneously exhibit an initial bond strength and the substances to be bonded can sufficiently be bonded without any other temporary tacking or fixing means.

An object of the present invention is to provide an improved aqueous emulsion adhesive in the form of a kit of an aqueous emulsion adhesive and a gelling agent, i.e. an improved two-part adhesive. Another object of the invention is to provide a method for bonding with the two-part adhesive as set forth above. A further object of the invention is to provide a method for applying the two-part adhesive to the substances to be bonded. These and other objects and advantages of the invention will be apparent to persons skilled in the art from the following description.

According to the present invention, both of the gelling agent and the aqueous emulsion adhesive are simultaneously applied to the substances to be bonded. That is, both of the gelling agent and the aqueous emulsion adhesive are each sprayed and thereby mixed in the state of mist, and then applied to the substances to be bonded. That is, the gelling agent and the aqueous emulsion adhesive are each simultaneously sprayed onto either one or both of the substances to be bonded so that the spraying areas of both the gelling agent and aqueous emulsion adhesive are overlapped, and thereafter, the substances to be bonded are piled up and a pressure is given thereon. The spraying machine is not limited and includes any machine which can spray both the gelling agent and aqueous emulsion adhesive so that the spraying areas are overlapped, for example using two spray guns which are regulated so that the both spraying areas are overlapped, or a spray gun having two spray nozzles (e.g. 69 GW PLURAL COMPONENT SPRAY GUN, made by Binks Manufacturing Company, in U.S.A.). Alternatively, both the gelling agent and aqueous emulsion adhesive may simultaneously be sprayed from air nozzle and fluid nozzle respectively by using one spray gun.

The gelling agent used in the present invention, which can gelate the aqueous emulsion adhesive, includes various surface active agents which can neutralize the surface charge of particles of emulsion contained in the aqueous emulsion adhesives, metal hydroxides, organic acids, organic acid salts, inorganic acid salts, water glass, and water-soluble organic solvents. As the gelling agent, there may also be used emulsions having an opposite charge of that of the aqueous emulsion adhesives, which means, for example, the case that when an anionic aqueous emulsion adhesive is used, a cationic emulsion is used as the gelling agent.

Suitable examples of the surface active agents are cationic surface active agents, such as salts of primary, secondary or tertiary alkylamines (e.g. laurylamine hydrochloride, dilaurylamine hydrochloride, lauryldimethylamine hydrochloride), alkanolamine salts (e.g. ethanolamine hydrochloride), polyethylenepolyamine salts (e.g. ethylenediamine hydrochloride, diethylenetriamine hydrochloride), quaternary ammonium salts (e.g. alkyltrimethylammonium hydrochloride), alkaline nitrogen-containing compounds (e.g. morpholine, guanidine, hydrazine, N,N-diethylenediamine, aminoethylethanolamine); anionic surface active agents, such as carboxylic acid salts (e.g. sodium laurate, sodium oleate, sodium stearate), higher alcohol sulfate salts, higher alkylpolyethyleneglycol sulfate salts, $\alpha$-olefin sulfate salts, alkylbenzene sulfonate salts, $\alpha$-olefin sulfonate salts, succinic acid sulfonate salts, higher alcohol phosphate salts, dithiophosphate salts; ampholytic surface active agents, such as carboxylic acid salt type ampholytic surface active agent (e.g. methyl laurylaminopropionate hydrochloride, lauryldimethylbetaine), and other ampholytic surface active agents of various types such as sulfate salts, sulfonate salts, phosphate salts, or the like.

Suitable examples of the metal hydroxides are calcium hydroxide, sodium hydroxide, potassium hydroxide, or the like. Suitable examples of organic acids are malic acid, citric acid, oxalic acid, lactic acid, and various amino acids. Suitable examples of the organic acid salts are sodium oxalate, calcium acetate, magnesium acetate, calcium pantothenate, and various amino acid salts such as glycine calcium salt, alanine calcium salt, serine calcium salt, threonine calcium salt, methionine calcium salt, phenylalanine calcium salt, calcium aspartate. Suitable examples of the inorganic acid salts are sodium chloride, potassium chloride, potassium bromide, sodium sulfate, aluminum sulfate, magnesium sulfate, copper sulfate, zinc sulfate, ferric sulfate, ferrous sulfate, calcium chloride, zinc chloride, magnesium chloride, aluminum chloride, magnesium carbonate, alum, metal primary phosphates (e.g. calcium primary phosphate, magnesium primary phosphate, zinc primary phosphate) or the like. Suitable examples of the water-soluble organaic solvents are alcohols (e.g. methanol, ethanol, isopropanol), ketones (e.g. acetone, methyl ethyl ketone), or the like.

These gelling agent may be used alone or in a combination of two or more thereof. The most suitable gelling agent can be selected in view of the components and characteristics of the aqueous emulsion adhesives, characteristics of the substances to be bonded and the application manners. Since the less corrosive action to the spraying machine, less effect onto human body, significant gelling effect, or the like, the carboxylic acid salt type surface active agents and organic acid salts are preferred. In case of using aqueous emulsion adhesive having carboxyl or methylol group, polyvalent metal salts of the organic acids or inorganic acids and polyvalent metal hydroxides (polyvalent metal means a metal having two or more valences) are preferable because they can give excellent bonding with improved heat resistance and water resistance. A polyfunctional epoxy compound may preferably be incorporated in order to improve the heat resistance and water resistance of the bonding. A combination of an organic acid salt or inorganic acid salt with a surface active agent is also preferable. In view of less toxicity to human body, amino acid salts and pantothenic acid salt are particularly preferable. That is, particularly preferred gelling agents are a member selected from calcium pantothenate, glycine calcium salt, alanine calcium salt, serine calcium salt, threonine calcium salt, methionine calcium salt, phenylalanine calcium salt and calcium aspartate, which are further preferably used in a combination with other gelling agents such as an organic acid salt (e.g. calcium acetate, zinc acetate, aluminum acetate, magnesium acetate) and an inorganic acid salt (e.g. magnesium sulfate, aluminum sulfate, zinc sulfate, copper sulfate, ferrous sulfate, ferric sulfate, calcium chloride, zinc chloride, magnesium chloride, alum, calcium primary phosphate, magnesium primary phosphate, zinc primary phosphate, ammonium chloride, aluminum nitrate, aluminum chloride, and ammonium sulfate) in view of saving of cost. Said other gelling agents are used in an amount of 5 to 50% by weight, preferably 8 to 30% by weight, based on total weight of the gelling agent.

The gelling agents are preferably used in the form of an aqueous solution, particularly an aqueous solution having a solid component of 0.5 to 50% by weight. If it is desirable to exhibit more rapidly the initial bond strength, an organic solvent solution may be used. The aqueous or organic solvent solution may be prepared when used.

The amount of the gelling agents is not critical and may vary with the kinds of the gelling agents, the aqueous emulsion adhesives and the substances to be bonded, but is usually in the ratio of the aqueous emulsion adhesive: the gelling agent = 100:0.005 to 100:5 by weight (as the solid component). Besides, when an emulsion is used as the gelling agent, the ratio of the aqueous adhesive: the gelling agent = 1:0.01 to 1:100 by weight is preferable. The application amount of the aqueous emulsion adhesive and gelling agent is preferably in the range of 50 to 300 g/cm$^2$ in total.

The aqueous emulsion adhesives used in the present invention include all aqueous emulsion adhesives, for example, emulsions containing as the main solid component polyvinyl acetate, vinyl acetate copolymer, polyacrylate, acrylate copolymer, ethylene/vinyl acetate copolymer, polyolefin, styrene/butadiene copolymer, methyl methacrylate/butadiene copolymer, nitrile/butadiene copolymer, polychloroprene, polyisoprene, polyurethane, polyepoxyasphalt, styrene/isoprene copolymer, maleic acid/isoprene copolymer sodium salt, polyvinyl chloride, vinylidene chloride copolymer, polyvinylpyrrolidone, polyvinyl alkyl ether, phenol-formalin reaction mixture, or the like. The emulsions may optionally contain tackifiers (e.g. rosin, denatured phenyl resin, terpene, petroleum resin, coumarone/indene resin), fillers (e.g. calcium carbonate, cley, silica, asbestos), plasticizers (e.g. higher alcohol, glycol, phthalic acid ester), colorants (e.g. titanium white, other dyestuffs or pigments), aging resistant agents (e.g. antioxidants, ultraviolet absorbers, acid absorbers), or the like. The emulsions contain a solid component of 15 to 75% by weight.

The two-part adhesive of the present invention is applicable to bond any substances, particularly substances, one of which can permeate or absorb water or steam and another one of which can not permeate or absorb water or steam. For instance, it is useful for bonding a polyurethane foam with a steel panel or plate.

The present invention is illustrated by the following Preparations and Examples, but is not limited thereto.

PREPARATION 1

| | |
|---|---|
| $Al_2(SO_4)_3 \cdot 18H_2O$ | 10% by weight |
| Water | 90% by weight |

The above components are mixed with agitation to give a gelling agent.

PREPARATIONS 2 to 7

Various gelling agents are prepared by using the components shown in Table 1 in the same manner as described in Preparation 1. In Table 1, the amount of the components is % by weight.

TABLE 1

| Components | Preparation No. | | | | | |
|---|---|---|---|---|---|---|
| | 2 | 3 | 4 | 5 | 6 | 7 |
| Calcium acetate $Ca(CH_3COO)_2 \cdot 2H_2O$ | 10 | — | — | — | — | — |
| Zinc acetate $Zn(CH_3COO)_2 \cdot 2H_2O$ | — | 5 | — | — | — | — |

TABLE 1-continued

| Components | Preparation No. | | | | | |
|---|---|---|---|---|---|---|
| | 2 | 3 | 4 | 5 | 6 | 7 |
| Magnesium chloride MgCl$_2$.6H$_2$O | — | — | 10 | — | — | — |
| Glacial acetic acid | — | — | — | 5 | — | — |
| Phosphoric acid | — | — | — | — | 10 | — |
| Alkylbenzenedimethyl-ammonium chloride (Sanisol B-50, made by Kao Atlas) | — | — | — | — | — | 10 |
| Water | 90 | 95 | 90 | 95 | 90 | 90 |

PREPARATIONS 8 to 15

Various gelling agents are prepared by using the components shown in Table 2 in the same manner as described in Preparation 1. In Table 2, the amount of the components is % by weight.

TABLE 2

| Components | Preparation No. | | | | | | | |
|---|---|---|---|---|---|---|---|---|
| | 8 | 9 | 10 | 11 | 12 | 13 | 14 | 15 |
| Calcium pantothenate | 10 | — | — | — | — | — | — | — |
| Glycine calcium salt | — | 10 | — | — | — | — | — | — |
| Alanine calcium salt | — | — | 10 | — | — | — | — | — |
| Serine calcium salt | — | — | — | 10 | — | — | — | — |
| Threonine calcium salt | — | — | — | — | 10 | — | — | — |
| Methionine calcium salt | — | — | — | — | — | 10 | — | — |
| Phenylalanine calcium salt | — | — | — | — | — | — | 10 | — |
| Calcium aspartate | — | — | — | — | — | — | — | 10 |

EXAMPLE 1

An anionic type acrylate copolymer emulsion adhesive (Penguin Bond No. 136, made by Sunstar Chemical Industry Co.,) and the gelling agent prepared in Preparation 1 (100:2 by weight) were applied to a polyurethane foam (made by MTP Chemical Co., 5×50×150 mm, foaming extent: 50-fold) in an amount of about 150 g/m$^2$ with a spray gun having two spray nozzles (69 GW Spray Gun, made by Binks Manufacturing Co.). After drying for a fixed time as shown in Table 2, a coated steel plate (coated with melamine alkyd, 200×50×0.8 mm) was piled up thereon, and was pressed with hand.

Immediately after the above contact pressing, the adhered product was horizontally kept so that the polyurethane foam became underside, and a weight of 50 g was given to one end of the polyurethane foam, and there was measured the time until the polyurethane foam was peeled off in the width of 100 mm. The test was done at 20° C. and a relative humidity of 65%. As a reference, the test was done in case of using no gelling agent. The results are shown in Table 3.

TABLE 3

| Test Product | Drying time (Second) | | | | |
|---|---|---|---|---|---|
| | 5 | 60 | 300 | 420 | 600 |
| Example 1 | ∞ | ∞ | ∞ | ∞ | ∞ |
| Reference | 0 sec. | 0 sec. | 5 sec. | 15 sec. | 30 sec. |

In the above test, in case of the product of Example 1, the peeling was merely about 5 mm in all drying times.

EXAMPLE 2

In the same manner as described in Example 1 except that the drying time was 5 seconds, a polyurethane foam and a steel plate were bonded by using the gelling agents prepared in Preparation 2 to 7, and the products thus obtained were subjected to the test of peeling likewise. As a reference, the test was done in case of using no gelling agent. The results are shown in Table 4.

TABLE 4

| Preparation No. | 2 | 3 | 4 | 5 | 6 | 7 | Reference |
|---|---|---|---|---|---|---|---|
| Time of peeling (second) | ∞ | ∞ | ∞ | 50 | 45 | ∞ | 0 |

In the above test, in case of the products obtained by using the gelling agents in preparation 2, 3 and 4, the peeling was merely about 5 mm, and in case of that obtained by using the gelling agent in Preparation 7, the peeling was merely about 30 mm.

As is clear from the above results in Table 3 and b 4, according to the present invention, the desired initial bond strength can be exhibited only by drying the coating layer for about 5 seconds, and hence, no temporary fixing is required.

EXAMPLE 3

An anionic type acrylate copolymer emulsion adhesive (Penguin Bond No. 136, made by Sunstar Chemical Industry Co.) and the gelling agents prepared in Preparation 8 to 15 (100:4 by weight) were applied to a polyurethane foam (made by MTP Chemical Co., 5×50×150 mm, foaming extent: 50-fold) in an amount of about 150 g/m$^2$ with a spray gun having two spray nozzles (69 GW Spray Gun, made by Binks Manufacturing Co.). After drying for a fixed time as shown in Table 5, a coated steel plate (coated with melanine alkyd, 200×50 ×0.8 mm) was piled up thereon, and was pressed with hand.

Immediately after the above contact pressing, the adhered product was horizontally kept so that the polyurethane foam became underside, and a weight of 50 g was given to one end of the polyurethane foam, and there was measured the time until the polyurethane foam was peeled off in the width of 100 mm. The test was done at 20° C. and a relative humidity of 65%. As a reference, the test was done in case of using no gelling agent. The results are shown in Table 5.

TABLE 5

| Test product | Drying time (second) | | | | |
|---|---|---|---|---|---|
| | 5 | 60 | 300 | 420 | 600 |
| Preparation 8 | ∞ | ∞ | ∞ | ∞ | ∞ |
| Preparation 9 | ″ | ″ | ″ | ″ | ″ |
| Preparation 10 | ″ | ″ | ″ | ″ | ″ |
| Preparation 11 | ″ | ″ | ″ | ″ | ″ |
| Preparation 12 | ″ | ″ | ″ | ″ | ″ |
| Preparation 13 | ″ | ″ | ″ | ″ | ″ |
| Preparation 14 | ″ | ″ | ″ | ″ | ″ |
| Preparation 15 | ″ | ″ | ″ | ″ | ″ |
| Reference | 0 | 0 | 5 | 15 | 30 |

In the above test, in case of the product of Preparation 8 to 15, the peeling was merely about 5 mm in all drying times.

As is clear from the above results in Table 5, according to the present invention, the desired initial bond strength can be exhibited only by drying the coating layer for about 5 seconds, and hence, no temporary fixing is required.

EXAMPLE 4

An anionic type acrylate copolymer emulsion adhesive (Penguin Bond No. 136, made by Sunster Chemical) and the gelling agents prepared in Preparation 8 to 15 (100:4 by weight) were applied to a steel plate (0.8×50×150 mm) in an amount of about 150 g/m² with a spray gun having two spray nozzles (69 GW Spray Gun, made by Binks Manufacturing Co.).

After drying at 20° C. and a relative hymidity of 60% for 24 hours, the products were subjected to the test of anticorrosive property in water at 20° C. for 24 hours. The results are shown in Table 6.

TABLE 6

| Preparation No. | 8 | 9 | 10 | 11 | 12 | 13 | 14 | 15 |
|---|---|---|---|---|---|---|---|---|
| anticorrosive property | | | | | | | | |

○: good, x: poor

EXAMPLE 5

The gelling agents prepared in Preparations 8 to 15 were applied to a polyurethane foam (80×80×4 mm, foaming extent: 50-fold, made by MTP Chemical Co.) in an amount of 50 g/m² with air spray and the coating layer was dried at room temperature for 24 hours.

A polyacrylate emulsion adhesive (Penguin Bond No. 135, made by Sunstar Chemical Industry Co.) was applied to a coated steel plate (coated with melamine alkyd, 100×100×0.8 mm) in an amount of 100 g/m² with airless spray. After 30 seconds, the steel plate was piled up with the polyurethane foam prepared above with facing the coating layers, and the resultant was rolled with a roller of 1 kg. After 30 seconds, the bonded product was subjected to a test for tensile strength in vertical direction to the bonding face with an autograph machine (IS-500, made by Shimazu Seisakusho) under the conditions of a rate of pulling: 500 mm/minute, a temperature: 20° C., and a relative humidity: 60%.

The results are shown in Table 7.

TABLE 7

| Gelling agents | Tensile strength (g/cm²) |
|---|---|
| Preparation 8 | 58.0 |
| Preparation 9 | 60.5 |
| Preparation 10 | 47.3 |
| Preparation 11 | 39.5 |
| Preparation 12 | 43.7 |
| Preparation 13 | 30.4 |
| Preparation 14 | 39.6 |
| Preparation 15 | 64.0 |

As is clear from the above test results, when the gelling agents of the present invention are used, the initial bond strength is rapidly exhibited, and hence, when this method is employed, the polyurethane foam can be bonded to the ceiling of a motor car without any temporary fixing.

EXAMPLE 6

The gelling agents prepared in Preparations 8–15 were applied to a polyurethane foam (140×100×5 mm) in an amount of 100 g/m² with air spray, and the coating layer was dried at 20° C. and a relative humidity of 60% for 24 hours.

A polyacrylate emulsion adhesive (Penguin Bond No. 135) was applied to a steel plate (140×100×0.7 mm) in an amount of 100 g/m² with air spray, and the resultant was allowed to stand at 20° C. and relative humidity of 60% for 1 minute, and thereafter, the steel plate thus coated was piled up with the polyurethane foam obtained above and pressed with hand. After 2 minutes, the resulting product was subjected to the test for tensile strength with an autograph machine in the same manner as described in Example 5. The results are shown in Table 8.

TABLE 8

| Gelling agents | Tensile strength (g/cm²) |
|---|---|
| Preparation 8 | 105 |
| Preparation 9 | 110 |
| Preparation 10 | 80 |
| Preparation 11 | 75 |
| Preparation 12 | 86 |
| Preparation 13 | 69 |
| Preparation 14 | 81 |
| Preparation 15 | 120 |

EXAMPLE 7

The gelling agent prepared in Preparation 15 was applied to a needled felt (80×80×4 mm) in an amount of 50 g/m² with spray, and dried at room temperature for 24 hours.

A carboxyl-modified SBR latex adhesive (Penguin Bond No. 551, made by Sunster Chemical Industry Co.) was applied to a coated steel plate (coated with melamine alkyd, 100×100×0.8 mm) in an amount of 150 g/m² with airless spray. After 30 seconds, the steel plate was piled up with the coated felt prepared above with facing the coating layers, and rolled with a roller of 1 kg. After allowing to stand for 30 seconds and 300 seconds, the product thus obtained was subjected to a test for tensile strength in the same manner as described in Example 5. The results are shown in Table 9.

TABLE 9

| Time of allowing | Tensile strength (g/cm²) | |
|---|---|---|
| to stand (seconds) | Example 3 | Reference* |
| 30 | 65.0 | 0.94 |
| 300 | 120.0 (M.F.) | 1.6 |

*: In Reference, no gelling agent was employed.

As is clear from the above test results, in case of the present invention, the bond strength is increased with lapse of time.

EXAMPLE 8

The gelling agent prepared in Preparation 15 was applied to the knitted cloth of a polyvinyl chloride leather with knitted back cloth in an amount of 50 g/m² with air spray and dried at room temperature for 1 hour or 24 hours.

A polyacrylate emulsion adhesive (Penguin Bond No. 135) was applied to the same coated steel plate as used in Example 7 in an amount of 150 g/m² with air spray, and after 30 seconds, it was piled up with the leather prepared above with facing the coating layers, and then rolled with a roller of 1 kg.

After allowing to stand for 30 seconds and 300 seconds, the product was subjected to the test of tensile strength in the same manner as described in Example 5. The results are shown in Table 10.

TABLE 10

| | Tensile strength (g/cm²) | | |
|---|---|---|---|
| | Example 4 Time of drying of the gelling agent (hour) | | |
| Time of allowing to stand (seconds) | 1 | 24 | Reference |
| 30 | 34.6 | 47.2 | 0.00 |

TABLE 10-continued

| | Tensile strength (g/cm$^2$) | | |
|---|---|---|---|
| | Example 4 | | |
| | Time of drying of the gelling agent (hour) | | |
| Time of allowing to stand (seconds) | 1 | 24 | Reference |
| 300 | 132.8 | 139.1 | 0.78 |

As is clear from the above test results, the bond strength is further improved with prolonging the time of drying of the gelling agent.

PREPARATIONS 16 to 21

Various gelling agents are prepared by using the components shown in Table 11 in the same manner as described in Preparation 1. In the table, the amount of the components is % by weight.

TABLE 11

| | Preparation No. | | | | | |
|---|---|---|---|---|---|---|
| Components | 16 | 17 | 18 | 19 | 20 | 21 |
| Calcium pantothenate | — | 10.0 | 8.0 | 5.0 | 10.0 | — |
| Calcium aspartate | 10.0 | — | — | 5.0 | — | 10.0 |
| Calcium acetate | 2.0 | 2.0 | 2.0 | 1.0 | 2.0 | — |
| Calcium chloride | — | — | 2.0 | 1.0 | — | 2.0 |
| Water | 88.0 | 88.0 | 88.0 | 88.0 | 88.0 | 88.0 |

EXAMPLE 9

An anionic type acrylate copolymer emulsion adhesive (Penguin Bond No. 136, made by Sunstar Chemical Industry Co., Ltd.) and the gelling agent prepared above (100:10 by weight) were applied to a polyvinyl chloride lamination urethane foam (thickness: 5 mm) in an amount of 200 g/m$^2$ with a spray gun having two spray nozzles (69 GW Spray Gun, made by Binks Manufacturing Co.).

After drying for 30 seconds, a coated steel plate (coated with melamine alkyd, thickness: 0.8 mm) was piled up thereon, and was pressed with hand.

Five minutes after the above contact pressing, the urethane foam was peeled off from the steel plate by drawing the urethane foam at a drawing rate of 200 mm/minute at an angle of 180° C., by which the initial bond strength was measured. The test was done at 20° C. and a relative humidity of 65%.

In the same manner as described above, the peeling test of the urethane foam was carried out except that the peeling of the urethane foam was done 48 hours after the contact pressing of the urethane foam and the steel plate, by which the adhesion was measured.

These results are shown in Table 12.

TABLE 12

| | Preparation No. | | | | | |
|---|---|---|---|---|---|---|
| Properties | 16 | 17 | 18 | 19 | 20 | 21 |
| Initial bond strength (kg/25 mm) | 1.0 (CF) | 1.0 (CF) | 1.0 (CF) | 1.0 (CF) | 1.0 (CF) | 1.0 (CF) |
| Adhesion (kg/25 mm) | 1.5 (MB) | 1.0 (MB) | 1.3 (MB) | 1.0 (MB) | 1.5 (MB) | 1.3 (MB) |

CF: Break of adhesive layer, MB: Break of urethane foam

What is claimed is:

1. A method for bonding two substances together which comprises applying a two-part adhesive comprising an aqueous synthetic resin emulsion adhesive and a gelling agent comprising a combination of (a) a member selected from the group consisting of calcium pantothenate, glycine calcium salt, alanine calcium salt, serine calcium salt, threonine calcium salt, methionine calcium salt, phenylalanine calcium salt and calcium aspartate and (b) a member selected from the group consisting of an organic acid salt and an inorganic acid salt to at least one of the substances to be adhered, disposing the substances one on the other, and then contact-pressing them together.

2. A method according to claim 1, wherein the organic acid salt is a member selected from the group consisting of calcium acetate, zinc acetate, aluminum acetate, and magnesium acetate.

3. A method according to claim 1, wherein the inorganic acid salt is a member selected from the group consisting of magnesium sulfate, aluminum sulfate, zinc sulfate, copper sulfate, ferrous sulfate, ferric sulfate, calcium chloride, zinc chloride, magnesium chloride, alum, calcium primary phosphate, magnesium primary phosphate, zinc primary phosphate, ammonium chloride, aluminum nitrate, aluminum chloride, and ammonium sulfate.

4. A method according to claim 1, wherein the aqueous synthetic resin emulsion adhesive and the gelling agent are simultaneously applied to the substances to be bonded in the form of spray.

5. A method according to claim 1, wherein the gelling agent is used in the form of a 0.5 to 50% by weight aqueous solution.

6. A method according to claim 1, wherein the aqueous synthetic resin emulsion adhesive and the gelling agent are used in the ratio of 100:0.005 to 100:5 by weight (as the solid component).

7. A two-part adhesive comprising an aqueous synthetic resin emulsion and a gelling agent comprising a combination of (a) a member selected from the group consisting of calcium pantothenate, glycine calcium salt, alanine calcium salt, serine calcium salt, threonine calcium salt, methionine calcium salt, phenylalanine calcium salt and calcium aspartate and (b) a member selected from the group consisting of an organic acid salt and an inorganic acid salt.

8. A two-part adhesive according to claim 7, wherein the organic acid salt is a member selected from the group consisting of calcium acetate, zinc acetate, aluminum acetate, and magnesium acetate.

9. A two-part adhesive according to claim 7, wherein the inorganic acid salt is a member selected from the group consisting of magnesium sulfate, aluminum sulfate, zinc sulfate, copper sulfate, ferrous sulfate, ferric sulfate, calcium chloride, zinc chloride, magnesium chloride, alum, calcium primary phosphate, magnesium primary phosphate, zinc primary phosphate, ammonium chloride, aluminum nitrate, aluminum chloride, and ammonium sulfate.

* * * * *